United States Patent [19]

Yokoshima et al.

[11] Patent Number: 4,517,726
[45] Date of Patent: May 21, 1985

[54] METHOD OF PRODUCING SEAL RING

[76] Inventors: Naohiko Yokoshima, 2-3-8 Miyanosaka; Nobuyoshi Masumoto, 5-5-1208 Kuzuha-hanazono-cho; Akira Sui, 2-2-20 Ueno, all of Hirakata-shi, Osaka-fu, Japan

[21] Appl. No.: 350,378

[22] Filed: Feb. 19, 1982

Related U.S. Application Data

[63] Continuation-in-part of Ser. No. 140,442, Apr. 17, 1980, abandoned.

[51] Int. Cl.³ .............................................. B23P 17/04
[52] U.S. Cl. ............................... 29/527.4; 219/121 P; 277/90; 427/34
[58] Field of Search ............................ 29/527.2, 527.4; 277/92, 224; 219/121 P; 427/34

[56] References Cited

U.S. PATENT DOCUMENTS

| | | | |
|---|---|---|---|
| 2,149,253 | 3/1939 | Cooper | 29/DIG. 36 |
| 3,539,192 | 11/1970 | Prasse | 277/224 |
| 3,606,359 | 9/1971 | McCormick | 227/224 |
| 3,814,447 | 6/1974 | Prasse et al. | 277/224 X |
| 3,826,506 | 7/1974 | Eckert | 277/92 |
| 3,914,573 | 10/1975 | Muchlburger | 219/121 P |
| 4,106,782 | 8/1978 | Hyde et al. | 227/224 X |
| 4,236,059 | 11/1980 | McComas et al. | 427/34 X |
| 4,256,779 | 3/1981 | Sokol et al. | 427/34 |

Primary Examiner—Charlie T. Moon

[57] ABSTRACT

A method of producing a seal ring for a floating seal assembly comprising forming a seal ring base from a low carbon steel, the seal ring base having a sealing portion formed thereon, subjecting the sealing portion to shot blasting, plasma spraying a cermet material on the sealing portion of the seal ring base to form a coated layer of the cermet material thereon, and lapping the coated layer to obtain a finished seal ring product having a plasma sprayed and lapped coating of the cermet material on the sealing portion.

6 Claims, 4 Drawing Figures

METHOD OF PRODUCING SEAL RING

BACKGROUND OF THE INVENTION

This application is a continuation-in-part application of applicant's pending U.S. patent application Ser. No. 140,442, filed on Apr. 17, 1980, now abandoned.

This invention relates to a method of producing a seal ring for a floating seal assembly adapted to be mounted on the tracks of construction vehicles.

The floating seal assembly of the kind specified is constructed such that a pair of annular seal rings are disposed to abut against each other by a pair of "O" rings mounted thereon. The outer peripheral sides of the seal rings on the opposite inner side surfaces form smooth surfaces having recesses formed in the middle parts thereof, and the inner peripheral sides form tapered faces. When parts of the smooth surfaces are allowed to abut against each other, they form a sealing portion so as to prevent the intrusion of sand and mud from the outside and also to prevent leakage of the lubricating oil filled therein.

When such floating seal is used for an extended period of time, the sealing contact faces of the sealing portion will be worn out by the intrusion of fine particles of earth and sand thereby reducing the sealing contact width. As a result, the face pressure will increase and the wear of the sealing contact faces is accelerated, and consequently, the sealing contact faces will gradually move towards the tapered portions on the inner peripheral sides. In brief, the remaining effective seal width of the sealing contact faces indicates the remaining life of the floating seal assembly itself.

For this reason, it is required for the seal rings of the floating seal assembly to have a high hardness. Therefore, the seal rings have heretofore been produced from blanks of antiabrasion special cast iron having a high hardness ($H_{RC}$ 65-70) and which contains as its main components Fe, Cr, W, Mo, Ni, V and Mn, etc.

Stating briefly, a seal ring base is produced by casting an antiabrasion iron, and after working the side of the seal ring base opposite to the sealing face thereof, the sealing face is machined to form a smooth surface. Further, annular grooves are formed in the seal ring base by machining and are then subjected to taper lapping works, first on the tapered face on the inner peripheral side, and subsequently, on the sealing face to obtain a seal ring of a predetermined shape.

Thus, the finished seal ring is obtained by subjecting a cast seal ring base having a high hardness to a great many workings, the working process of the blank is complicated and difficult thereby increasing the manufacturing cost of seal rings.

SUMMARY OF THE INVENTION

It is therefore an object of the present invention to provide a method of producing a seal ring for a floating seal assembly which is capable of reducing the production cost remarkably.

Another object of the present invention is to provide a method of producing a seal ring for a floating seal assembly which is simple in process and the seal ring product produced thereby can exhibit an excellent durability.

In accordance with an aspect of the present invention, there is provided a method of producing a seal ring for a floating seal assembly, comprising: forming a seal ring base from a low carbon steel, said seal ring base having a sealing portion formed thereon; plasma spraying a cermet material containing WC and Ni on the sealing portion of said seal ring base to form a coated layer of the cermet material thereon, the cermet material to be plasma sprayed being semi-fused by a plasma jet before impinging on the sealing portion; and lapping said coated layer to obtain a finished seal ring product having a plasma sprayed and lapped coating of the cermet material on the sealing portion.

It is advantageous to treat the sealing portion of the seal ring base by shot blasting to clean the sealing portion prior to the plasma spraying step.

The thickness of the cermet coating should preferably be in the range of 0.07 mm to 0.15 mm and more preferably in the range of 0.09 mm to 0.12 mm.

It is essential for a seal ring to limit the porosity of the sealing portion thereof as low as possible. If porosity of the sealing portion becomes high, sand and earth will likely to penetrate therein leading to a quick wear of the seal ring. It is also essential for a seal ring to have enough toughness. For this reason hardness of the sealing portion should preferably be controlled from 600 to 800 in micro Vickers.

For attaining these objectives, a cermet material including WC and Ni should not be completely fused by plasma jet but is semi-fused before impinging on the sealing surface of a seal ring thereby providing the sealing portion of the seal ring having appropriate toughness and hardness. Distance between the tip of a plasma gun and the sealing surface to be coated must also be carefully controlled for providing a smooth coating having porosity of 1% or less. It is proved that the above distance should be less than 75 mm and preferably in the range of 40 to 75 mm.

DETAILED DESCRIPTION OF THE INVENTION.

The present invention will now be described in detail below by way of example only with reference to the accompanying drawings.

Figure 1:
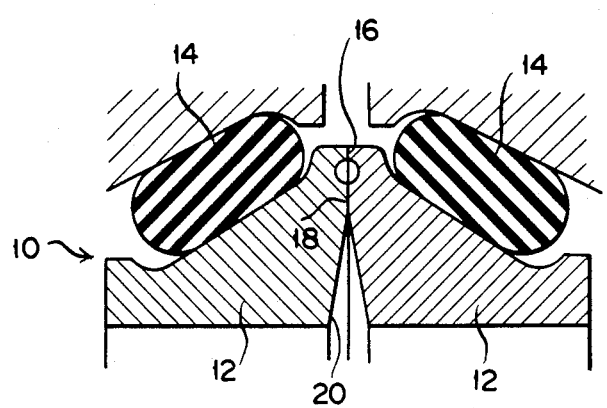
FIG. 1 is a cross-sectional view of a floating seal assembly mounted in the track of a tractor wherein the seal assembly includes a pair of seal rings produced by the method of the present invention.

Referring to FIG. 1, there is shown a well known floating seal assembly 10 which comprises a pair of seal rings 12, 12 of antiabrasion cast iron and a pair of elastomeric retaining members 14, 14 such as "O" rings mounted so as to permit one of said seal rings to rotate relative to the other and in sealing contact with each other. Such seal assembly is adapted to be mounted on the axle system or reduction gear, etc. of construction vehicles such as bulldozers or excavators, etc. and serves to prevent leakage of the lubricating oil in the seal rings and also prevent the intrusion of soil, sand and other kinds of abrasive particles therein. Because this floating seal assembly 10 is usually used under very severe conditions, the seal rings 12 are made of a very hard antiabrasion cast iron composed of Fe, Cr, W, Mo, Ni, V and Mn, etc. as mentioned hereinabove. This invention has been made in view of the fact that antiabrasion property is required only for a very thin layer of the seal rings which extends from the surface of the sealing portion thereof. The approximate required depth of the layer can be obtained by calculation.

Figure 2:
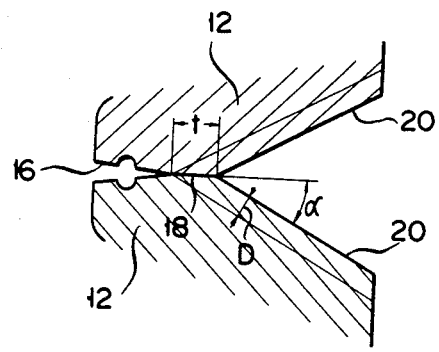
FIG. 2 is a cross-sectional view of seal rings wherein the outer sealing portion has worn out and the tapered angle is somehow exaggeratedly shown.

Referring to FIG. 2, there is shown an exaggerated condition where first sealing portions 16, 16 of the seal rings 12 are worn out by the earth and sand intruded therein and second sealing portions 18, 18 are in sealing contact. In FIG. 2, the depth D of the layer requiring a high hardness can be obtained by the following formula.

$$D = t \times \sin \alpha$$

where t is a width of seal rings in sealing contact, and $\alpha$ is an inclined or tapered angle formed by tapered portions 20, 20.

For example, the sealing contact width of a conventional seal ring having a diameter of 100 mm is in the order of 1.0 mm to 2.0 mm, and the tapered angle $\alpha$ of the tapered portions 20, 20 is in the range of one degree to two degrees. Therefore, if t is 2.0 mm and $\alpha$ is 2 degrees, $D = 0.07$ mm can be obtained by the aforementioned formula. Accordingly, in general, it can be said that a high hardness is required only for the seal ring, about 0.1 mm thick from the sealing faces.

According to the present invention, there is provided a method of producing a seal ring for a floating seal assembly, comprising the steps of forming a seal ring base from a low carbon steel by cold forging and machining, subjecting the sealing portion of said seal ring base to plasma spraying of a high-hardness material (having $H_{RC}$ of more than 65), and then lapping the plasma sprayed layer to obtain a finished high-hardness coating, about 0.07 mm to 0.15 mm thick. The thickness of the resultant coating should more preferably be 0.09 mm to 0.12 mm. Further, it is desirable to effect shot blasting treatment prior to the plasma spraying. The characteristic feature of the present invention is to form a high-hardness and high abrasion resisting coating on the sealing portions of seal rings by plasma spraying. Therefore, a plasma spraying device will be described below with reference to FIG. 3.

The plasma spraying device comprises a soundproof dust-collector housing 22 made of steel plate and glass wool, said housing having a bottom wall 24, a plate 28 mounted on the bottom wall 24 so as to be rotated horizontally by means of a motor 26, said plate 28 having an annular magnet 30 secured thereto so as to attract and carry a seal ring 12, and a plasma gun 32 carried so as to oscillate freely opposite to the sealing face of said seal ring, said plasma gun 32 being connected through a linkage 34 to a motor 36. The arrangement is made such that plasma spraying is made by oscillating the plasma gun 32 on the sealing face of the seal ring 12 which is being rotated.

Reference numeral 38 denotes a gas supply hose, 40 a cooling water supply pipe which serves also as an electrode, 42 a cooling water discharge pipe, 44 a duct connected to a dust collector, and 46 a spraying material supply nozzle.

The gas supplied through the gas supply hose 38 contains $N_2$ gas and $H_2$ gas. The $N_2$ and $H_2$ gases are heated by the plasma gun 32 to a high temperature and are ionized in the plasma form so that the nozzle at the leading end of the plasma gun 32 may inject plasma having a temperature of several thousands degrees centigrade. As a result, the spraying powder supplied through the spraying powder supply nozzle 46 is fused by the plasma and is sprayed on the sealing portion of the seal ring 12. The spraying powder should preferably be WC+Ni base cermet.

It is essential for a seal ring to limit the porosity of the sealing portion thereof as low as possible. If porosity of the sealing portion becomes high, sand and earth will likely to penetrate therein leading to a quick wear of the seal ring. It is also essential for a seal ring to have enough toughness. For this reason hardness of the sealing portion should preferably be controlled from 600 to 800 in micro Vickers.

For attaining these objectives, a cermet material including WC and Ni should not be completely fused by plasma jet but is semi-fused before impinging on the sealing surface of a seal ring thereby providing the sealing portion of the seal ring having appropriate toughness and hardness.

Figure 3:
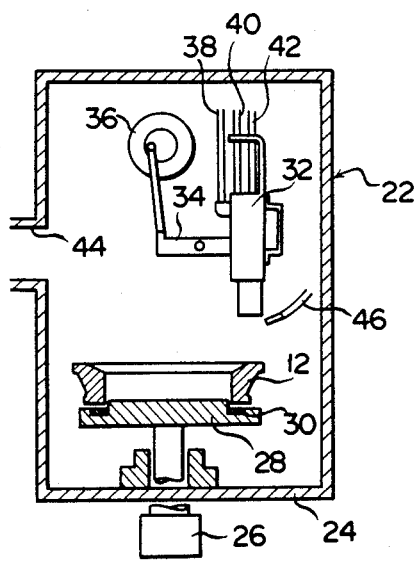
FIG. 3 is a schematical cross-sectional view of a plasma spraying machine used in the method of the present invention.

Therefore in the present invention, the spraying powder is not introduced into the plasma gun 32 where temperature is high enough to fuse the spraying powder completely, but instead it is supplied to the plasma jet at the point immediately below the tip of the plasma gun 32 as shown in FIG. 3.

Distance between the tip of the plasma gun and the sealing surface to be coated must also be carefully controlled for providing a smooth coating having porosity of 1% or less. It is proved that the above distance should be less than 75 mm and preferably in the range of 40 to 75 mm.

A preferable example of the present invention will be described in detail below.

EXAMPLE I

A pipe or flat plate shaped blank made of SS 41 steel (Japanese Industrial Standard) which is a low carbon steel was subjected to cold forging and machining to form a seal ring base of a predetermined shape having an outer diameter of 100 mm. Subsequently, the sealing portion of the seal ring base thus obtained was subjected to shot blasting using blasting materials WA No. 20 to 24 to give the surface of the sealing portion a degree of roughness of about 30$\mu$. After checking that the sealing portion is free from oily matters and rust etc., the seal ring base was put on the plate 28 (FIG. 3) so as to be attracted by the magnet 30. The plasma spraying machine used in this case was 7 M System of METCO Inc., and the spraying powder employed was 439 NS-2, a product of METCO Inc. The powder 439 NS-2 is a cermet containing WC and Ni as its main components. The spraying powder supplying rate was 0.95 to 1.0 gr/sec, and plasma spraying was made for ten seconds by introducing the powder into the plasma jet at the point immediately below the leading end of the plasma gun 32 while the distance between the leading end of the plasma gun 32 and the seal ring base 12 is kept to be about 75 mm and the seal ring base 12 is being rotated at the rate of 930 rpm. During the plasma spraying, the plasma gun 32 made weaving motion, the amplitude of which was 4 mm and the frequency thereof was 0.5 Hz. The thickness of the plasma sprayed coating was measured at about 0.15 mm. Subsequently, the sealing portion coated by plasma spraying was subjected to lapping thereby obtaining a finished seal ring product with a high-hardness coating of about 0.09 mm on the sealing portion thereof.

Figure 4:
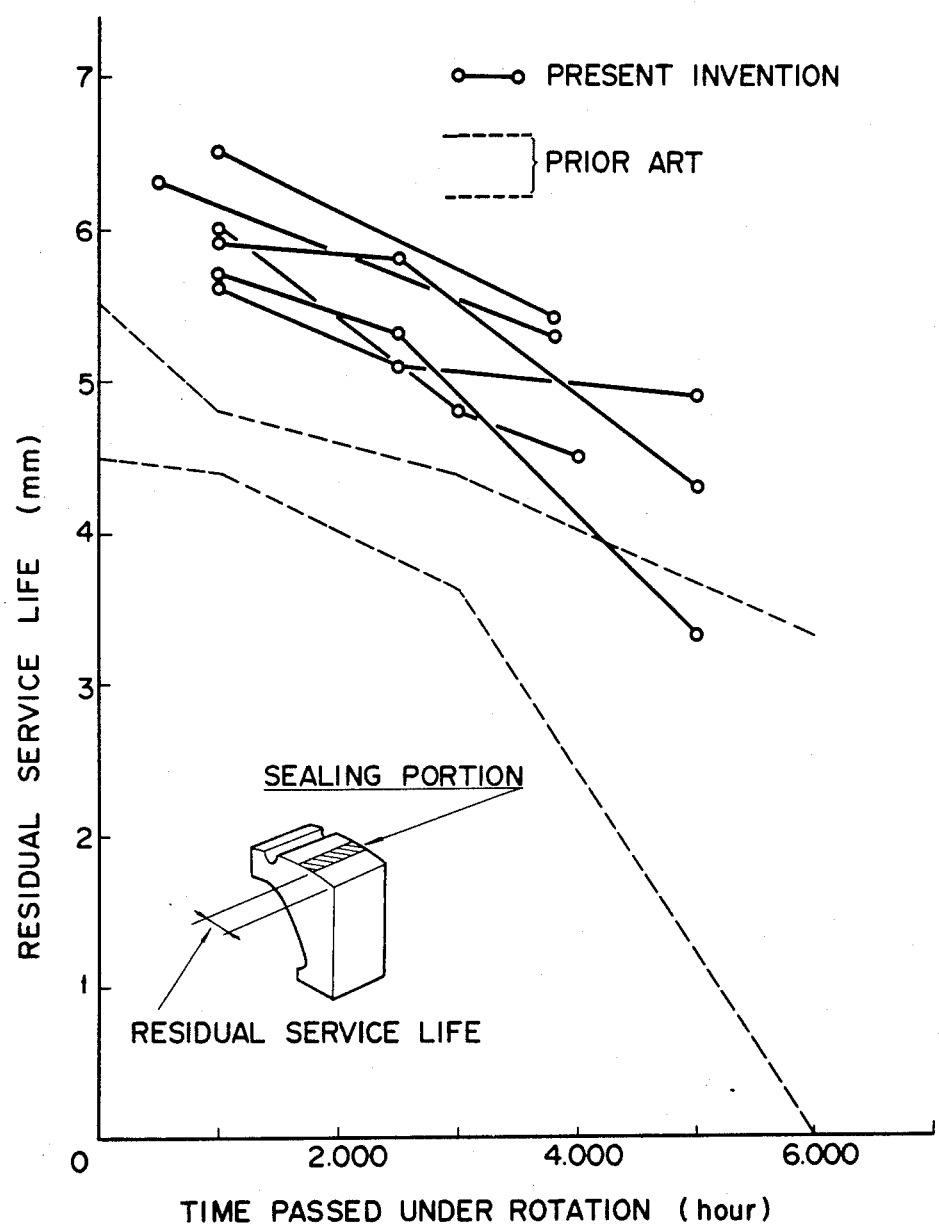
FIG. 4 is a diagram showing a comparison in durability between seal rings produced by the method of the present invention and those produced by a conventional casting method.

Referring to FIG. 4, there are shown durability test results of a seal ring produced by the plasma spraying method of the present invention and that produced by a conventional casting method under the same condition. The outside diameter and inside diameter of the seal rings were 100 mm and 80 mm, respectively. In this drawings, solid lines indicate the case of seal rings produced by the method of the present invention, whilst the region surrounded by dotted lines indicates the case of seal rings produced by the conventional method.

It is obvious from this result, that the durability of the seal rings produced by the method of the present invention is slightly superior to that of the seal rings produced by the conventional method.

As described in detail hereinabove, according to the present invention, since the seal ring base can be produced by subjecting a comparatively mild steel to cold forging and machining, the working thereof can be made easily and the production cost thereof becomes extremely low as compared to that of seal rings produced by the conventional casting method. Further, since the sealing portion of the seal ring base can be coated with a high-hardness material by plasma spraying, working can be made in a short time and efficiently.

It is to be understood that the foregoing description is merely illustrative of a preferred embodiment of the invention, and that the scope of the invention is not to be limited thereto, but is to be determined by the scope of the appended claims.

What we claim is:

1. A method of producing a seal ring for a floating seal assembly, comprising: forming a seal ring base from a low carbon steel, said seal ring base having an external tapered surface and a sealing portion formed thereon; plasma spraying a cermet material containing WC and Ni on the sealing portion of said seal ring base to form a coated layer of the cermet material thereon using a plasma gun having a tip, the cermet material to be plasma sprayed being introduced at a position outside of said tip of said gun and being semi-fused by a plasma jet before impinging on the sealing portion while carefully controlling a distance between the plasma gun and the sealing portion so that the coated layer has a porosity of 1% or less; and lapping said coated layer to obtain a finished seal ring product having a plasma sprayed and lapped coating of the cermet material on the sealing portion.

2. A method of producing a seal ring for a floating seal assembly as recited in claim 1 wherein the method further comprises, prior to said plasma spraying step, subjecting the sealing portion of said seal ring base to shot blasting to clean the sealing portion thereof.

3. A method of producing a seal ring for a floating seal assembly as recited in claim 1 or 2 wherein the thickness of the lapped coating of said finished seal ring product is in the range of about 0.07 mm to about 0.15 mm.

4. A method of producing a seal ring for a floating seal assembly as recited in claim 1 or 2 wherein the thickness of the lapped coating of said finished seal ring product is in the range of about 0.09 mm to about 0.12 mm.

5. A method of producing a seal ring for a floating seal assembly as recited in claim 1 or 2, wherein said distance is less than or equal to 75 mm.

6. As method of producing a seal ring for a flating seal assembly as recited in claim 5, wherein said distance is from 40 to 75 mm.

* * * * *